United States Patent [19]
Brown

[11] Patent Number: 5,403,425
[45] Date of Patent: Apr. 4, 1995

[54] PHOTO-EMULSIONED LAMINATE

[75] Inventor: Peter L. Brown, 7600 E. Cypresshead Dr., Parkland, Fla. 33067

[73] Assignee: Peter L. Brown, Parkland, Fla.

[21] Appl. No.: 153,647

[22] Filed: Nov. 17, 1993

[51] Int. Cl.[6] .............................................. B32B 31/00
[52] U.S. Cl. ................................. 156/249; 156/252; 156/286; 156/344
[58] Field of Search ............... 156/252, 253, 286, 240, 156/241, 344, 247, 249, 286

[56] References Cited

U.S. PATENT DOCUMENTS

| | | | |
|---|---|---|---|
| 802,022 | 10/1905 | Schill | 156/249 |
| 3,334,003 | 8/1967 | Edwards | 156/240 |
| 3,674,109 | 7/1972 | Murase | 156/286 |
| 3,738,890 | 6/1973 | Johnson et al. | 156/286 |
| 3,876,726 | 4/1975 | Ford, Jr. et al. | 260/859 |
| 3,901,758 | 8/1975 | Humphries | 156/499 |
| 3,943,031 | 3/1976 | Krueger et al. | 156/583 |
| 3,951,724 | 4/1976 | Johnson et al. | 156/382 |
| 4,049,483 | 9/1977 | Loder et al. | 156/230 |
| 4,081,282 | 3/1978 | Merrill et al. | 96/77 |
| 4,188,254 | 2/1980 | Hemperly, Jr. | 156/382 |
| 4,216,286 | 8/1980 | Greene et al. | 156/288 |
| 4,237,206 | 12/1980 | Fujita | 430/11 |
| 4,295,910 | 10/1981 | Cooley et al. | 156/314 |
| 4,407,932 | 10/1983 | Loder et al. | 430/256 |
| 4,552,604 | 11/1985 | Green | 156/273.3 |
| 4,789,625 | 12/1988 | Ellerstein et al. | 430/372 |

OTHER PUBLICATIONS

Print Guard TM -UV Laminating Materials Product Specification Sheet, Seal Products, Inc., 550 Spring Street, Naugatuck, Conn.

Fusion TM 4000 Plus & Fusion Ultra Dry Mounting Adhesive Product Specification Sheet, Seal Products, Inc., 550 Spring Street, Naugatuck, Conn.

Seal Products, Inc., Technical Specifications for Heat Activated Overlaminates, Print Guard TM UV, Aug., 1992.

Primary Examiner—Chester T. Barry
Attorney, Agent, or Firm—Hedman, Gibson & Costigan

[57] ABSTRACT

A laminated photo-emulsioned substrate for use in customizing a wide variety of articles, and a process for making the substrate, is disclosed.

11 Claims, 3 Drawing Sheets

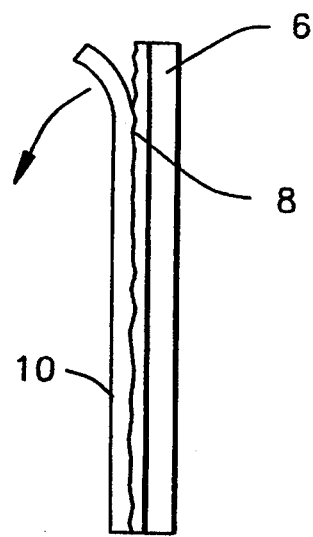
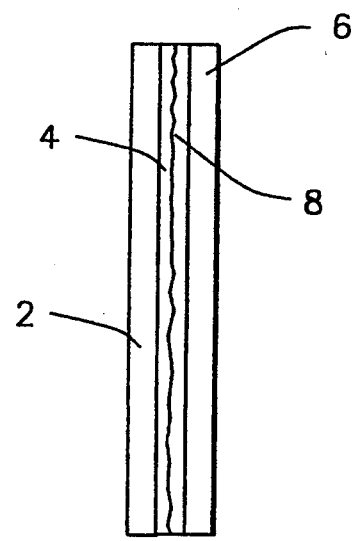
FIG. 3　　　　　　　FIG. 4
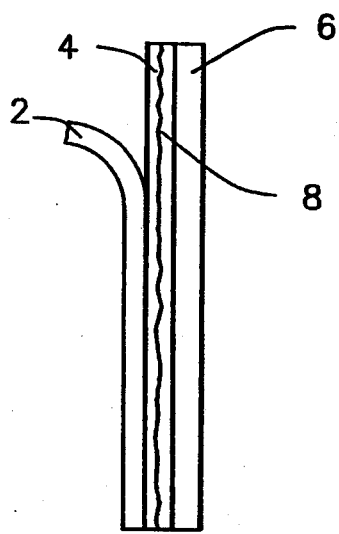
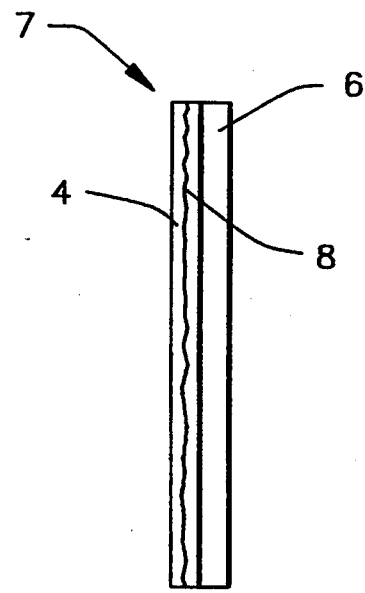
FIG. 5　　　　　　　FIG. 6

PHOTO-EMULSIONED LAMINATE

The present invention relates to a laminated photo-emulsioned substrate. The present invention also relates to a process for preparing a laminated photo-emulsioned substrate. The present invention further relates to articles having the laminated photo-emulsioned substrate placed thereon.

BACKGROUND OF THE PRESENT INVENTION

Ever since their development, photographs have provided people with a source of great enjoyment. Photographs are an excellent means to record special events during a person's lifetime. The photographs are commonly displayed in photo albums and in picture frames. Additionally, many people use photographs as a means of customizing their belongings by attaching the photograph thereto, such as by adhesives.

The present inventor has now found a novel method of customizing a wide variety of products by preparing photo-emulsioned laminates. These novel laminates can easily be applied to products such as photo albums, magnetic clip boards, wall mounted cork pin-up boards, Puff frames and picture sets, notebooks, all manner of personalized sign-in books for special occasions, personal phone books, hanging clocks, automobile seatback covers, video cassette covers and the like.

SUMMARY OF THE PRESENT INVENTION

According to the present invention there is provided a photo-emulsioned laminate comprising a photo-emulsion adhered to a laminate substrate.

Also according to the present invention there is provided a process for preparing a laminated photo-emulsioned substrate comprising the steps of:
 (a) contacting a photographic print having a photo-emulsion adhered to paper with a heat reactive laminate to transfer said photo-emulsion to said laminate;
 (b) removing said paper from the photo-emulsioned laminate.

Further, according to the present invention there is provided an article of manufacture comprising a substrate material having a photo-emulsioned laminate adhered thereto.

BRIEF DESCRIPTION OF THE DRAWINGS

FIGS. 1–6 illustrates in cross-sectional views a preferred embodiment of the process of the present invention.

DETAILED DESCRIPTION OF THE PRESENT INVENTION

The present invention provides a photo-emulsioned laminate which can be applied as a customization means to a wide variety of articles.

Figure 1:
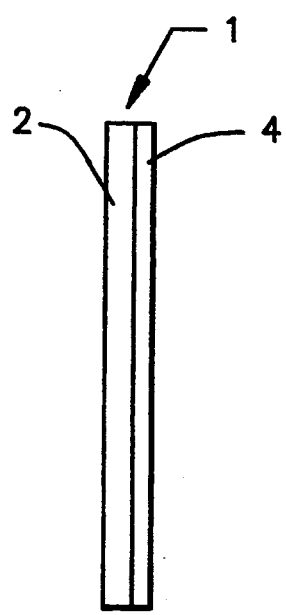

In its broadest sense, the photo-emulsioned laminates of the present invention comprise a photo-emulsion adhered to a laminate substrate. The photo-emulsion is that which is removed from a typical, i.e. conventional, photographic print. Referring to FIG. 1, developed film can be viewed as a photo-emulsion 4 containing the photograph which is adhered to a paper backing 2. By the process of the present invention, the photo-emulsion 4 is removed from the paper backing 2 and transferred to a laminate substrate (see FIG. 6).

Figure 2:
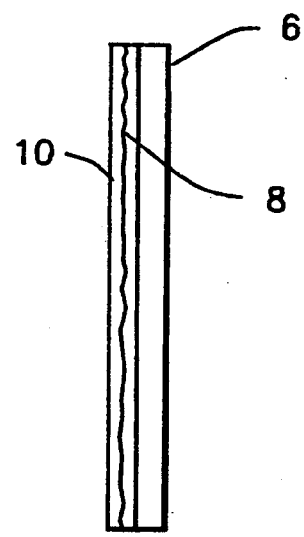

Referring to FIG. 2, the laminate substrates 6 useful in the practice of the present invention are those which have a reactive side containing a reactive compound 8 which is suitable for receiving a photo-emulsion. Typically, these are heat reactive photo laminate sheets which are commercially available, such as Print Guard TM UV laminate. See product specification sheet from Seal Products, Inc., Naugatuck Conn. 06770-9985. Generally the reactive compound 8 is protected with a suitable removable backing 10. The laminates 6 are preferably relatively clear, however, if desired colored or tinted laminates may also be employed. Referring to FIG. 3, when ready for use, the backing 10 is easily removed exposing the reactive compound 8.

Referring to FIG. 4, the photographic print is then placed in contact with the heat reactive photolaminate, the emulsion side 4 of the photo facing the reactive side 8 of the laminate sheet 6. The print and sheet are then placed in a vacuum press at a pressure below atmospheric, such as from 0 to 50 mmHg, preferably 0 to 25 mm Hg; and a temperature of from about 150° to about 225° F., preferably from about 175° to about 200° F., for a time sufficient to effect the transfer and adherence of the photo-emulsion from the photographic paper to the laminate, i.e., from about 5 to about 15 minutes, preferably from about 8–10 minutes.

Any conventional vacuum press may employed in the practice of the present invention. These are commercially available, such as from Seal Incorporated, and are generally described in U.S. Pat. Nos. 4,188,254 (Hemperly, Jr.), 3,951,724 (Johnson et al.) and 3,738,890 (Johnson et al.).

In a preferred embodiment of the present invention, prior to transfer and adherence of the photoemulsion to the reactive laminate, the laminate sheet 6 is perforated on the non-reactive side with a star wheel or other device in order to facilitate the escape of air from between the laminate sheet and photo-emulsion during the vacuum heat press cycle. The amount of perforation is not critical to the present invention, and need only be sufficient to prevent the formation of air bubbles.

The resulting unitary sheet from the vacuum heat press is then allowed to cool to room temperature. Referring to FIG. 5, the paper backing 2 of the photographic print is then removed by any means known to those skilled in the art. Typically, the paper backing 2 can be removed by wedging a cutting instrument, such as a razor blade, between the laminated emulsion and the photo print paper backing to start the separation. The paper backing 2 is completely peeled off of the laminated emulsion sheet 7. The peeling process may be facilitated by clamping down the laminated emulsion sheet 7 and using a rolling tube to peel the remaining paper backing 2.

Referring to FIG. 6, the laminated photo emulsion sheet 7 is then ready for attachment to a suitable article such as a photo album, book binding, cover, wrapping, telephone book, engagement sign-in book, Bible book shell, notebook, clipboard or other article which the user is desirous of customizing by applying a suitable commercially available adhesive to the laminate 6. A preferred adhesive is a heat reactive adhesion transfer sheet, such as Seal Brands Fusion TM. See product specification sheets on Fusion TM 4000 Plus and Fusion Ultra by Seal Products, Naugatuck, Conn. 06770-9985.

Figure 7:
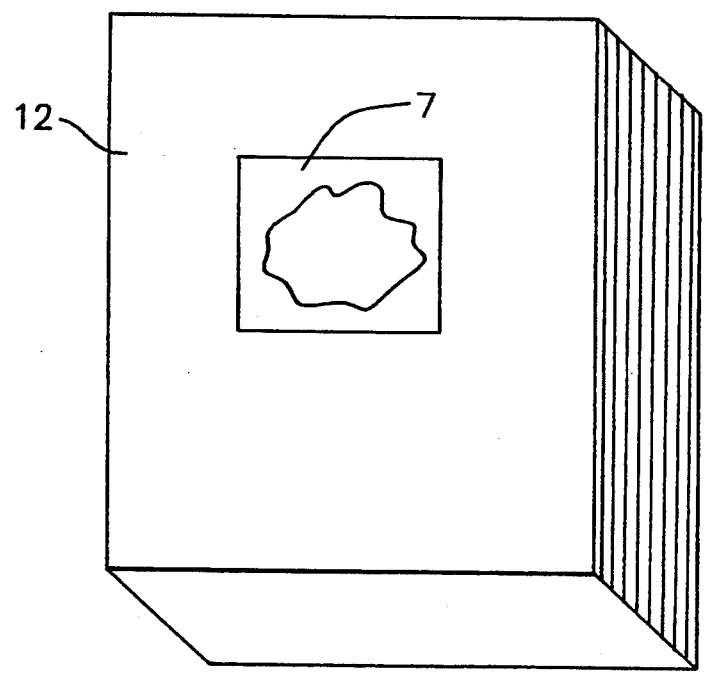
FIG. 7 illustrates a top view of a photo album having a photo-emulsioned laminate thereon.

In a particularly preferred embodiment as shown in FIG. 7, the laminated photoemulsion sheet 7 is adhered to the cover of a photo album 12.

Many variations of the present invention will suggest themselves to those skilled in the art in light of the above-detailed description. For example, the photo-emulsion laminate can be attached a wide variety of substrates. Further, the heat reactive laminate sheet may be selected from a wide variety of commercially available source. All such obvious modifications are within the full intended scope of the appended claims.

All of the above-referenced patents, patent applications and publications are hereby incorporated by reference.

I claim:

1. A process for preparing a laminated photo-emulsioned substrate from a conventional photographic print having a photo emulsion adhered to a paper backing comprising the steps of:
   (a) contacting the photo emulsion with a PRINT GUARD TM heat reactive laminate to adhere said photo emulsion to said laminate in a vacuum press at a temperature ranging from about 150° F. to about 225° F. and a pressure ranging from about 0 to about 50 mm Hg for a time ranging from about 5 to about 15 minutes to produce a combined sheet comprising a photo emulsioned laminate and paper backing;
   (b) cooling said combined sheet to room temperature; and
   (c) peeling said paper backing from the photo emulsioned laminate.

2. A process for preparing a laminated photo-emulsioned substrate from a conventional photographic print having a photo emulsion adhered to a paper backing comprising the steps of:
   (a) contacting the photo emulsion with a PRINT GUARD TM heat reactive laminate to adhere said photo emulsion to said laminate at a temperature ranging from about 150° F. to about 225° F. and a pressure ranging from about 0 to about 50 mmHg for a time ranging from about 5 to about 15 minutes to produce a combined sheet comprising a photo emulsioned laminate and paper backing;
   (b) cooling said combined sheet to room temperature; and
   (c) peeling said paper backing from the photo emulsioned laminate.

3. A process as defined in claim 2 wherein said temperature ranges from about 175° F. to about 200° F. and said pressure ranges from about 0 to about 25 mm Hg.

4. A process as defined in claim 2 wherein said contacting is carried out for a time ranging from about 8 to about 10 minutes.

5. A process as defined in claim 2 which further comprises perforating said heat reactive laminate prior to contacting with the photographic print.

6. A process as defined in claim 5 wherein said perforation is sufficient to prevent the formation of air bubbles between the heat reactive laminate sheet and the photographic print during contacting.

7. A process as defined in claim 2 further comprising applying an adhesive to said photo emulsioned laminate and attaching the adhesive-containing photo emulsioned laminate to a substrate.

8. A process as defined in claim 7 wherein said substrate comprises the cover of a photo album.

9. A process as defined in claim 7 wherein said substrate comprises the cover of an engagement sign-in book.

10. A process as defined in claim 7 wherein said substrate comprises a clipboard.

11. A process as defined in claim 7 wherein said substrate comprises a personal phone book.

* * * * *